US008534956B2

United States Patent
Dyson-Coope et al.

(10) Patent No.: US 8,534,956 B2
(45) Date of Patent: Sep. 17, 2013

(54) HAND HELD DEVICE FOR INJECTING PRESSURIZED PRODUCTS INTO SOIL

(76) Inventors: Chris Dyson-Coope, Weston, MO (US); Warren Moore, Lenexa, KS (US)

(\*) Notice: Subject to any disclaimer, the term of this patent is extended or adjusted under 35 U.S.C. 154(b) by 379 days.

(21) Appl. No.: 12/798,588

(22) Filed: Apr. 7, 2010

(65) Prior Publication Data
US 2010/0258043 A1   Oct. 14, 2010

Related U.S. Application Data

(60) Provisional application No. 61/212,393, filed on Apr. 10, 2009.

(51) Int. Cl.
*A01G 29/00* (2006.01)

(52) U.S. Cl.
USPC ....... 405/128.75; 239/375; 239/526; 239/532

(58) Field of Classification Search
USPC ...... 111/118, 200, 900, 7.1–7.4; 405/128.75, 405/36, 258.1, 263; 239/375, 302, 525, 526, 239/532; 47/48.5, 57.5, DIG. 10
See application file for complete search history.

(56) References Cited

U.S. PATENT DOCUMENTS

| 5,611,643 A * | 3/1997 | Tallard .......................... 405/157 |
| 2003/0010714 A1 * | 1/2003 | Gallagher et al. ............ 210/634 |
| 2006/0107998 A1 * | 5/2006 | Kholy et al. ...................... 137/3 |

\* cited by examiner

*Primary Examiner* — Christopher J Novosad
(74) *Attorney, Agent, or Firm* — Mashburn Law Office; Donna Denise Mashburn

(57) ABSTRACT

A system for use in providing moisture for plants including; a corn based polymer jell in a pressurized container pressurized to a first pressure above atmospheric pressure. A flexible hose connected to the pressurized container and to a manually operated pump, the manually operated pump supplying polymer jell pressurized at a second pressure higher than the first pressure through a rigid tube and out a tip on the tube and into soil.

16 Claims, 3 Drawing Sheets

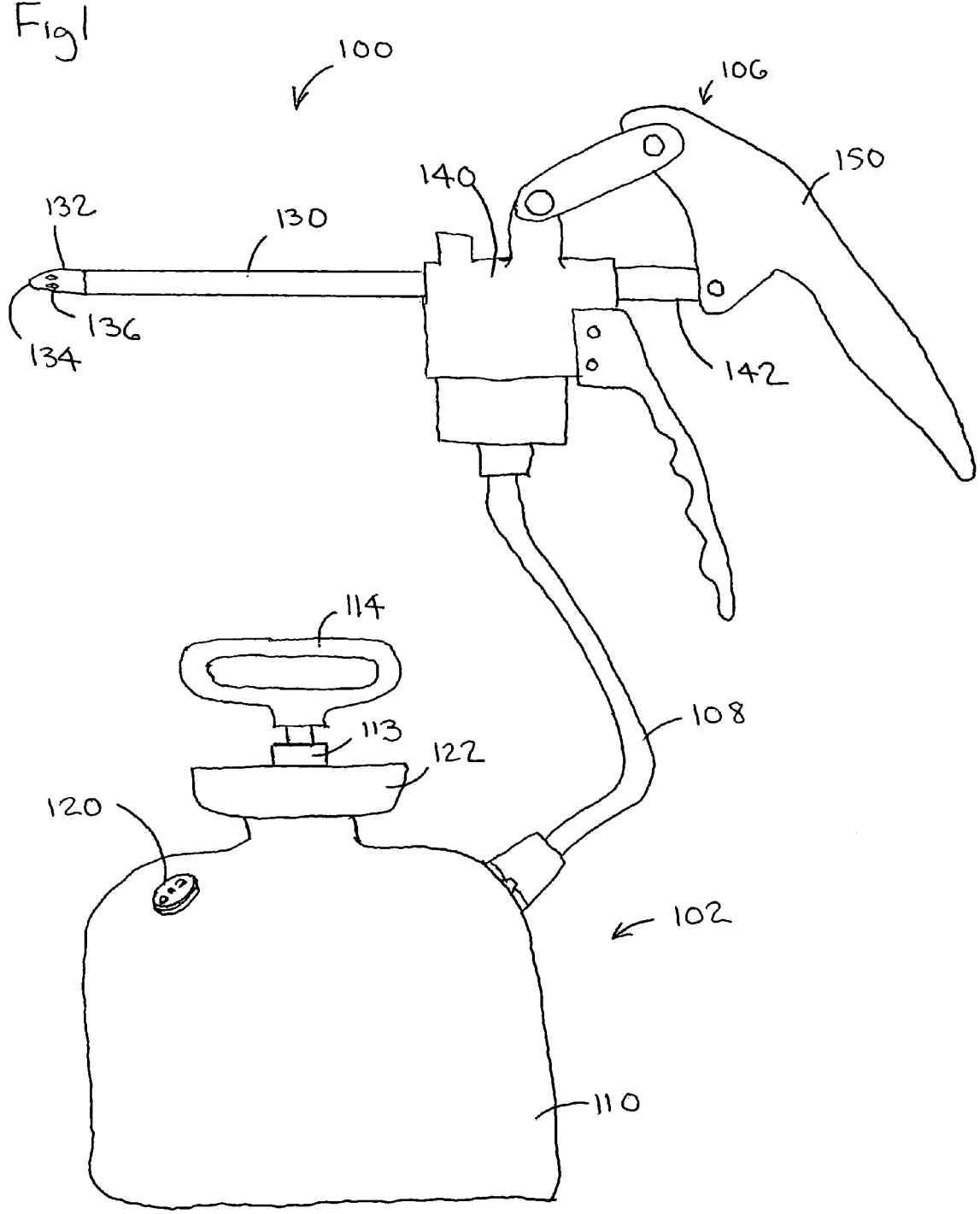

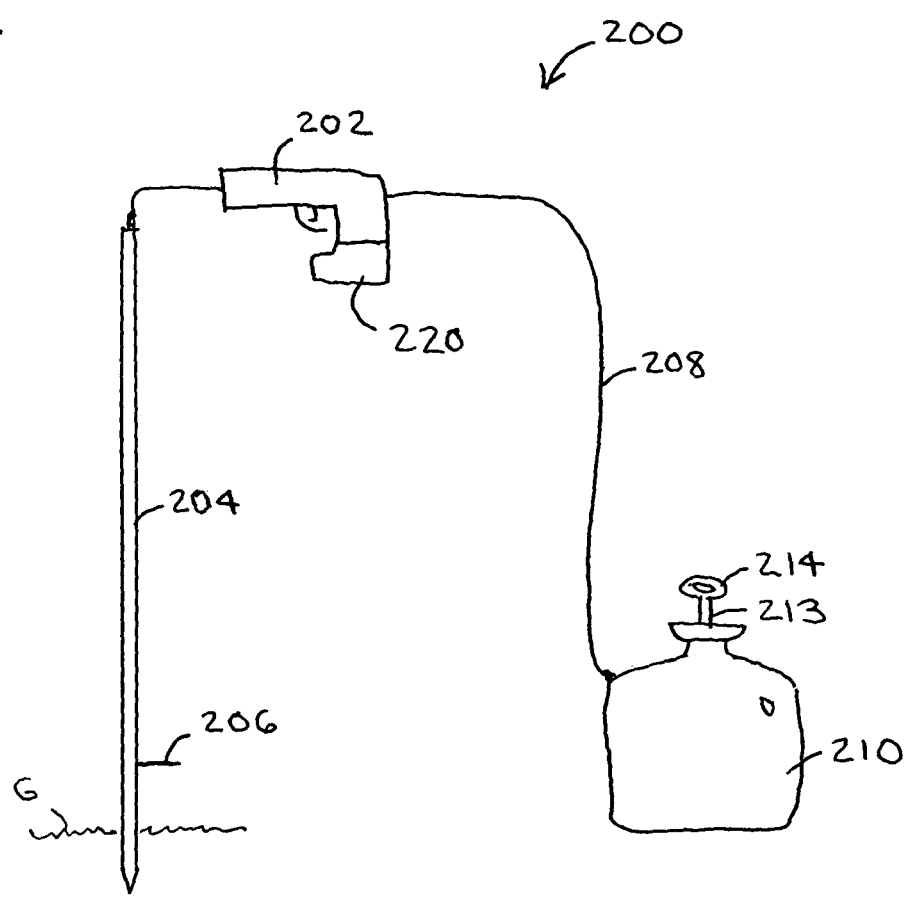

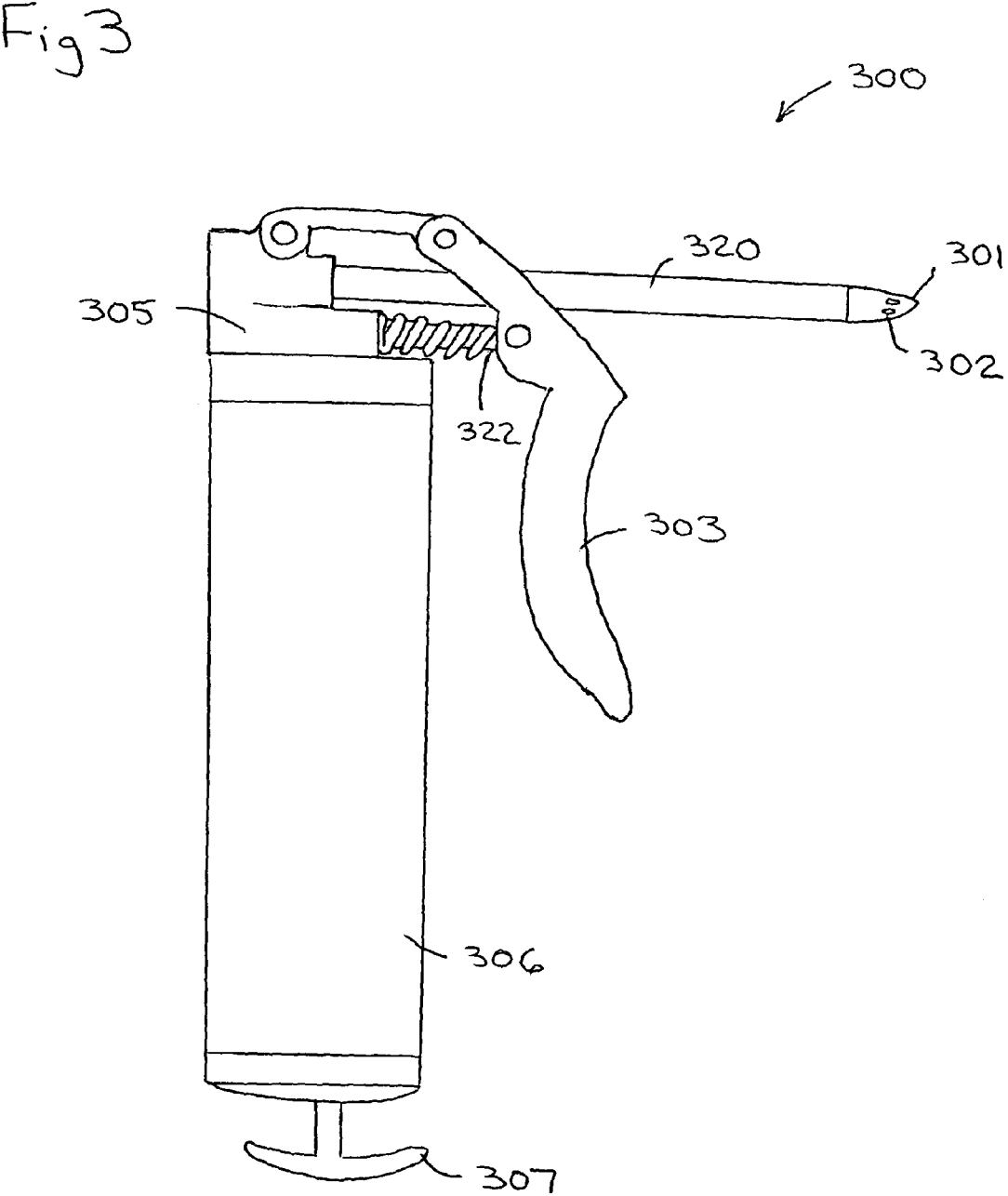

HAND HELD DEVICE FOR INJECTING PRESSURIZED PRODUCTS INTO SOIL

RELATED APPLICATIONS

Applicant claims priority under 35 U.S.C. 119 to U.S. provisional patent application 61/212,393 filed Apr. 10, 2009.

BACKGROUND OF THE INVENTION

It is known to water plants by inserting water into the soil using a pipe. U.S. Pat. No. 4,170,948 is a prior art patent that shows a soil insertable watering device. The problem with the prior art and with watering in general is that water runs off and evaporates so that plants quickly dry out. To maintain plants at a peak of health frequent re-watering is required.

U.S. Pat. No. 5,659,998 discloses a water absorbent polymer that improves watering by preventing run off and by making water available as it is needed. A problem with this polymer is that it is difficult to inject because of its viscosity. Currently polymer based systems are used either by planting the dry polymer with the plant or by injecting it with large agriculture equipment such as might be used on a golf course.

Thus it can be seen that there is a need for improved apparatus and method to hand water plants.

SUMMARY OF THE INVENTION

The present invention provides a plant watering device including; a system for use in providing moisture for plants including;
a corn based polymer jell in a pressurized container pressurized to a first pressure above atmospheric pressure. A flexible hose connected to the pressurized container and to a manually operated pump, the manually operated pump supplying polymer jell pressurized at a second pressure higher than the first pressure through a rigid tube and out a tip on the tube and into soil.

BRIEF DESCRIPTION OF THE DRAWINGS

FIG. 1 shows a view of the device;
FIG. 2 shows a view of a first alternate embodiment device in use; and
FIG. 3 shows a second alternate embodiment.

DETAILED DESCRIPTION OF THE DEVICE

FIG. 1 shows a view of the water based jell injection device 100. The device 100 works by injecting partially hydrated polymer jell. The jell or paste is formed by partially hydrating dry polymer. For example, a dry biodegradable corn or soy based polymer might be capable of absorbing 400 times its own weight in water, a jell might be formed by allowing the polymer to absorb only 12 to 20 times its own weight in water and then injecting the jell into the ground or soil where it can absorb more water. The water contained in the polymer jell will be available for plants adjacent the jell to use as needed.

FIG. 1 shows that the watering device 100 includes a pressurized storage tank 102 connected to a hand trigger system 106 by a fluid connection such as flexible hose 108. The pressurized storage tank 102 includes a container such as storage cylinder 110 that can be pressurized up to 50 psi with an air pressure plunger such as hand pump 113. The pump handle 114 can double as a handle to carry the storage cylinder 110. The 50 psi pressure is sufficient to force jell from the bottom of storage cylinder 110 into the flexible hose 108. The storage cylinder 110 includes a pressure release valve 120 that can be used to release pressure in the storage cylinder 110 if the user wants to disassemble the device 100 or remove the lid 122 of the storage cylinder 110. The flexible hose 108 includes a threaded disconnect 109 that can be removed from the container 110 for clean up.

FIG. 1 also shows that the hand trigger system 106 includes an elongated delivery tube 130 that can be inserted into soil. The tube 130 includes a tip 132 with a point 134 and openings such as holes 136 through which jell flows. The tube 130 can be metal or other rigid material and the tip 132 can be plastic or metal. The jell is delivered under pressure from container 110 through hose 108 to a pump chamber within housing 140. A cylindrical piston 142 is aligned with the pump chamber. By squeezing handle 150, the piston will move in the chamber and displace jell from the housing 140 into the tube 130 and ultimately through holes 136 in tip 132. When the tip 132 is inserted in soil there may be back pressure resisting the flow of jell. The piston 142 is able to deliver jell at a pressure as high as 3000 psi. So jell moves from a source of pressure of up to 50 psi to a source of high pressure up to 3000 psi.

In use the a user removes the lid 122 and pours a premeasured packet of polymer into the container 110, then the container 110 is filled with water such that the weight of water is about 16 times the weight of the premeasured packet of polymer. The lid 122 is then placed back on the container 110 and the contents can be mixed and the container 110 is pressurized using pump 113. Once the container 110 is pressurized polymer jell will be able to flow from the container 110 through the flexible hose 108 to the housing 140. As jell flows to the housing 140 squeezing the trigger handle 150 three times allows jell to expel air and charge the tube 130. Once the tube 130 is charged the tube 130 can be inserted several inches into the ground or soil adjacent to a plant and the trigger handle 150 can be squeezed several times to release polymer jell at high pressure into the soil through holes 136. An advantage is that the device 100 can inject partially hydrated polymers and additives enabling an even distribution around a previously planted tree, shrub, potted or containerized plant or hanging basket. Once the user is done pressure can be released on container 110 with pressure release valve 120 and the flexible hose 108 can be removed from the container 110 and from the housing 140 and all parts can be cleaned up using soap and water.

FIG. 2 shows an alternate embodiment of the system 200 which includes a trigger activated battery powered electric pump 202 to deliver jell at the high pressure. The tube 204 can be several feet long and includes a handle or cleat 206 to allow the tube 204 to be inserted into the ground from a standing position of the user. The system 200 includes a pressurized container 210 with a hand pump 213 and handle 214 and a flexible tube 208 to carry jell to the trigger pump 202. A battery pack 220 can be attached to the pump 202. The powered embodiment of the system 200 can deliver jell at a higher pressure, up to 8000 psi and in higher volumes and so is ideal for commercial applications that still require manual application of jell.

FIG. 3 shows a small hand held embodiment of the system 300 which includes an injection nozzle 301 suitable to be inserted into the ground and which includes openings 302. The nozzle 301 forms the tip of a delivery tube 320. The system 300 includes a spring returned trigger 303 and trigger support 304. The trigger 303 drives a piston 322 that drives fluid through a hydraulic pump 305 at a high pressure up to 3000 psi for example. Partially hydrated jell is held in a storage container 306 that is pressurized to a low pressure (up to 100 psi for example) by handle plunger 307. The system 300 is small enough to fit into the hand of an operator with their fingers wrapped around the handle 303 such that squeezing the trigger 303 will pump jell from the low pressure container 306, through the high pressure tube 320 to nozzle openings 302. In this embodiment the handle 303 and container 306 form a handle for holding the system 300 and for inserting the tube 320 into the ground.

The invention claimed is:

1. A system for use in providing moisture for plants comprising:
   a partially hydrated polymer gel in a container pressurized to a first pressure above atmospheric pressure;
   a flexible hose connected to said container and to a first manually operated pump;
   said first manually operated pump including a trigger; and
   said first manually operated pump supplying said partially hydrated polymer gel pressurized at a second pressure higher than said first pressure through a rigid tube and out a tip on said tube and into soil adjacent to a plant root system.

2. The system of claim 1 wherein said low pressure is in the range of 0-100 psi and said high pressure is in the range of 1000-8000 psi.

3. The system of claim 1 wherein said pressurized container is pressurized by a second manual pump attached to a lid of the container.

4. The system of claim 1 wherein said container includes a handle for carrying the container.

5. The system of claim 1 wherein said tube includes means for manually inserting the tube into the soil.

6. The system of claim 1 wherein said partially hydrated polymer gel is hydrated with an amount of water weighing in the range of 10-20 times the weight of dry polymer and wherein said partially hydrated gel can absorb at least 200 times the dry polymer weight in additional water.

7. A system for use in providing moisture for plants comprising:
   a partially hydrated polymer gel in a container pressurized to a first pressure above atmospheric pressure;
   a fluid connection between said container and a first pump, said fluid connection supplying said partially hydrated polymer gel from said container to said pump;
   said first pump including a manually operated trigger; and
   said pump supplying said partially hydrated polymer gel pressurized at a second pressure higher than said first pressure through a rigid tube and out a tip on said tube and into soil adjacent to a plant root system.

8. The system of claim 7 wherein said partially hydrated polymer gel is hydrated with an amount of water weighing in the range of 10-20 times the weight of dry polymer and wherein said partially hydrated gel can absorb at least 200 times the dry polymer weight in additional water.

9. The system of claim 7 wherein said tube includes a handle for manually inserting the tube into the soil.

10. The system of claim 7 wherein said pressurized container pressurized by a second manual pump attached to a lid of the container and wherein said fluid connection is a flexible hose connected to the container.

11. The system of claim 7 wherein said low pressure is less than 100 psi and said high pressure is in the range of 1000-8000 psi.

12. The system of claim 7 wherein said container includes a handle for carrying the container.

13. A device for use in supplying partially hydrated gel for plants comprising:
   a first pump;
   a container including a second pump to pressurize said container to a first pressure above atmospheric pressure;
   a fluid connection between said container and the first pump;
   said first pump including a manually operated trigger; and
   said first pump capable of supplying polymer gel pressurized at a second pressure higher than said first pressure through a rigid tube and out a tip on said tube and into soil adjacent to a plant root system.

14. The system of claim 13 wherein said tube includes a handle for manually inserting the tube into the soil.

15. The system of claim 14 wherein said second pump is a manual pump attached to a lid of the container and wherein said fluid connection is a flexible hose connected to the container.

16. The system of claim 15 wherein low pressure is less than 100 psi and said high pressure is in the range of 1000-8000 psi.

* * * * *